(12) United States Patent
Watanabe et al.

(10) Patent No.: US 11,567,033 B2
(45) Date of Patent: Jan. 31, 2023

(54) SENSOR ELEMENT (71) Applicant: NGK INSULATORS, LTD., Nagoya (JP)

(72) Inventors: Yusuke Watanabe, Nagoya (JP); Takashi Hino, Nagoya (JP); Mika Kai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 337 days.

(21) Appl. No.: 16/715,110

(22) Filed: Dec. 16, 2019

(65) Prior Publication Data
US 2020/0209185 A1 Jul. 2, 2020

(30) Foreign Application Priority Data

Dec. 27, 2018 (JP) .............................. JP2018-245370

(51) Int. Cl.
*G01N 27/407* (2006.01)
*G01N 27/406* (2006.01)
*G01N 27/41* (2006.01)

(52) U.S. Cl.
CPC ..... *G01N 27/4077* (2013.01); *G01N 27/4067* (2013.01); *G01N 27/4073* (2013.01); *G01N 27/41* (2013.01)

(58) Field of Classification Search
CPC ............. G01N 27/406; G01N 27/4067; G01N 27/407–4074; G01N 27/4077; G01N 27/41
See application file for complete search history.

(56) References Cited

U.S. PATENT DOCUMENTS

| 4,824,549 A * | 4/1989 | Hamada ............. G01N 27/4072 204/410 |
| 4,859,307 A * | 8/1989 | Nishizawa ......... G01N 27/4072 204/425 |
| 2007/0084724 A1* | 4/2007 | Mori .................. G01N 27/4071 204/424 |

(Continued)

FOREIGN PATENT DOCUMENTS

| DE | 102015212086 A1 * | 12/2016 |
| JP | 2013-234896 A | 11/2013 |

(Continued)

*Primary Examiner* — Maris R Kessel
*Assistant Examiner* — Vivian A Tran
(74) *Attorney, Agent, or Firm* — Mattingly & Malur, PC (57) ABSTRACT

A sensor element includes: an element base including: a ceramic body made of an oxygen-ion conductive solid electrolyte, and having an inlet at one end portion thereof; at least one internal chamber located inside the ceramic body, and communicating with the gas inlet; and an electrochemical pump cell including an outer electrode, an inner electrode facing the chamber, and a solid electrolyte therebetween, and a porous leading-end protective layer covering a leading end surface and four side surfaces in a predetermined range of the element base on the one end portion, wherein the protective layer has an extension extending into the gas inlet and fixed to an inner wall surface of the ceramic body demarcating the gas inlet, and a gap communicating with the gas inlet is located in the protective layer, with demarcated by a portion of the protective layer continuous with the extension.

8 Claims, 6 Drawing Sheets

(56) References Cited

U.S. PATENT DOCUMENTS

| | | | | |
|---|---|---|---|---|
| 2009/0120791 A1* | 5/2009 | Miyashita | ............ | G01N 27/4077 |
| | | | | 204/412 |
| 2011/0186431 A1* | 8/2011 | Horisaka | ............ | G01N 27/4077 |
| | | | | 204/424 |
| 2015/0040642 A1* | 2/2015 | Oya | ............ | F01N 11/007 |
| | | | | 73/23.32 |
| 2017/0045471 A1* | 2/2017 | Maeda | ............ | G01N 27/4074 |

FOREIGN PATENT DOCUMENTS

| JP | 5530950 B2 | 6/2014 |
|---|---|---|
| JP | 2016-188853 A | 11/2016 |

\* cited by examiner

SENSOR ELEMENT

CROSS-REFERENCE TO RELATED APPLICATION

The present application claims priority from Japanese application JP2018-245370, filed on Dec. 27, 2018, the contents of which is hereby incorporated by reference into this application.

BACKGROUND OF THE INVENTION

Field of the Invention

The present invention relates to a gas sensor detecting a predetermined gas component in a measurement gas, and, in particular, to a configuration of a leading end portion of a sensor element included in the gas sensor.

Description of the Background Art

As a gas sensor for determining concentration of a desired gas component in a measurement gas, a gas sensor that includes a sensor element made of an oxygen-ion conductive solid electrolyte, such as zirconia ($ZrO_2$), and including some electrodes on the surface and the inside thereof has been widely known. The gas sensor is mainly installed onto an exhaust pipe of an internal combustion engine, such as a vehicle engine, and is used to detect a predetermined gas component contained in an exhaust gas from the internal combustion engine and further to measure the concentration of the gas component.

As such a sensor element, a sensor element including a protective layer formed of a porous body (porous protective layer) at an end portion thereof at which a gas inlet for introducing the measurement gas is provided has been known (see Japanese Patent Application Laid-Open No. 2013-234896, Japanese Patent No. 5530950, and Japanese Patent Application Laid-Open No. 2016-188853, for example).

The porous protective layer is provided to trap particles of magnesium, zinc, phosphorus, silicon, lead, sulfur, and the like collectively referred to as poisoning substances contained in the exhaust gas from the internal combustion engine along with the gas component, and to prevent cracking of a gas sensor element occurring due to adherence, to the gas sensor element, of water droplets into which water vapor in the exhaust gas condenses, which is so-called water-induced cracking.

When the gas sensor is used for the above-mentioned application, the sensor element is frequently subjected to thermal shock due to repeated heating up in use of the internal combustion engine and cooling down not in use of the internal combustion engine. To achieve long-term stable operation of the gas sensor, it is required to provide the porous protective layer so that delamination and, further, detachment thereof do not occur upon receipt of thermal shock caused repeatedly.

Such delamination and, further, detachment occurring during long-term use of the gas sensor are not preferable because an introduction path of the measurement gas increases to more than expected at product designing, diffusion resistance acting on the measurement gas decreases, and, as a result, an output from the sensor element increases to more than a predetermined value.

While the exhaust gas from the internal combustion engine contains not only the gas component but also the particles of magnesium, zinc, phosphorus, silicon, lead, sulfur, and the like collectively referred to as the poisoning substances, continuous use of the gas sensor causes clogging of the porous protective layer due to progression of adherence of the poisoning substances, and eventually degrades performance of the gas sensor.

Japanese Patent Application Laid-Open No. 2013-234896 and Japanese Patent No. 5530950 disclose a gas sensor element in which a porous diffusion control part or diffusion resistance layer is used as a gas introduction part, and a porous protective layer is provided at a leading end portion so that a space is formed adjacent to the gas introduction part.

Japanese Patent Application Laid-Open No. 2016-188853 discloses a gas sensor element in which a slit-like diffusion control part provided at a leading end portion is used as a gas inlet, and a porous protective layer is provided adjacent to a leading end surface.

However, none of Japanese Patent Application Laid-Open No. 2013-234896, Japanese Patent No. 5530950, and Japanese Patent Application Laid-Open No. 2016-188853 disclose or suggest a gas sensor in which, in a sensor element having a gas inlet opening to a leading end surface, adhesion of a porous protective layer to the gas inlet is positively secured, and the influence of clogging of the porous protective layer on performance of the gas sensor is reduced.

SUMMARY

The present invention relates to a gas sensor detecting a predetermined gas component in a measurement gas, and is, in particular, directed to a configuration of a leading end portion of a sensor element included in the gas sensor.

According to the present invention, a sensor element included in a gas sensor detecting a predetermined gas component in a measurement gas includes: an element base including: an elongated planar ceramic body made of an oxygen-ion conductive solid electrolyte, and having a gas inlet at one end portion thereof; at least one internal chamber located inside the ceramic body, and communicating with the gas inlet under predetermined diffusion resistance; at least one electrochemical pump cell including an outer pump electrode located on an outer surface of the ceramic body, an inner pump electrode located to face the at least one internal chamber, and a solid electrolyte located between the outer pump electrode and the inner pump electrode, the at least one electrochemical pump cell pumping in and out oxygen between the at least one internal chamber and an outside; and a heater buried in a predetermined range on a side of the one end portion of the ceramic body, and a porous leading-end protective layer covering a leading end surface and four side surfaces in a predetermined range of the element base on the one end portion, wherein the leading-end protective layer has an extension extending into the gas inlet and fixed to an inner wall surface of the ceramic body demarcating the gas inlet, and a gap communicating with the gas inlet is located in the leading-end protective layer, with demarcated by a surface of a portion of the leading-end protective layer continuous with the extension.

Accordingly, the sensor element in which delamination and, further, detachment of the porous leading-end protective layer on a side of the leading end surface of the element caused by application of thermal shock are suitably suppressed, adhesion of the leading-end protective layer to the element base is suitably secured, and reduction in sensitivity caused by clogging of the leading-end protective layer by poisoning substances is suitably suppressed can be achieved.

It is thus an object of the present invention to provide a sensor element for a gas sensor in which adhesion of a porous leading-end protective layer to an element base on a side of a leading end surface is suitably secured, and performance degradation caused by clogging of the leading-end protective layer is suitably suppressed.

These and other objects, features, aspects and advantages of the present invention will become more apparent from the following detailed description of the present invention when taken in conjunction with the accompanying drawings.

DESCRIPTION OF THE PREFERRED EMBODIMENTS

<Overview of Sensor Element and Gas Sensor>

Figure 1:
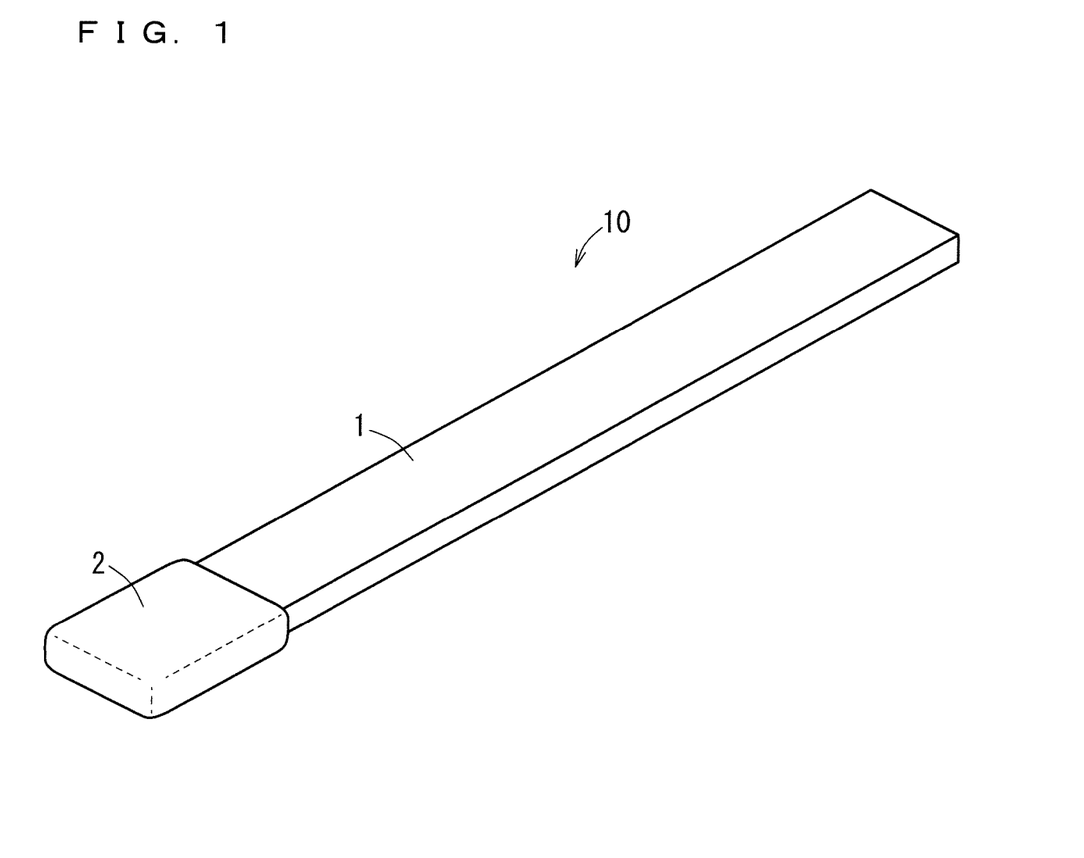
FIG. 1 is a schematic external perspective view of a sensor element (gas sensor element) 10.
Figure 2:
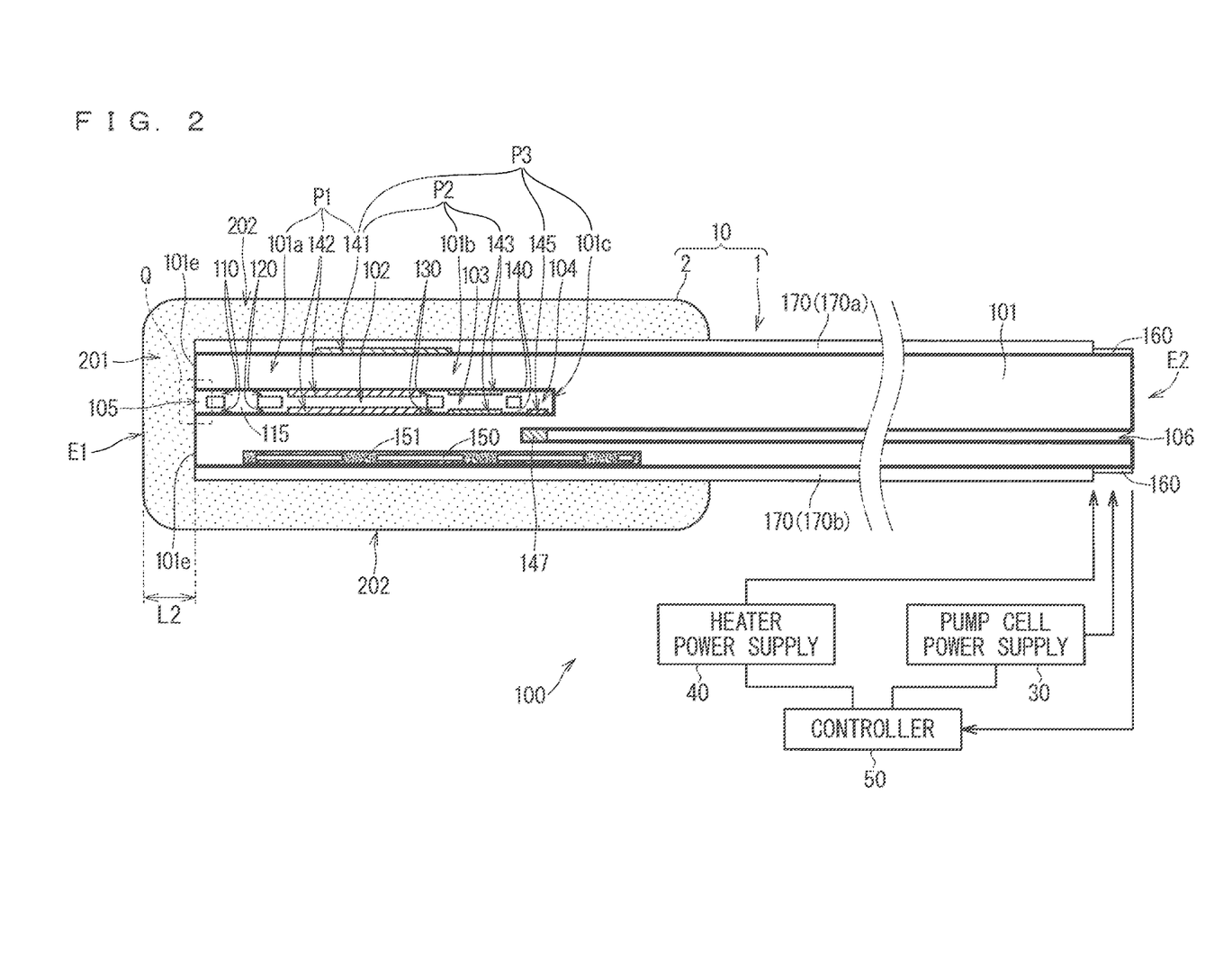
FIG. 2 is a schematic view illustrating a configuration of a gas sensor 100 including a sectional view taken along a longitudinal direction of the sensor element 10.

FIG. 1 is a schematic external perspective view of a sensor element (gas sensor element) 10 according to an embodiment of the present invention. FIG. 2 is a schematic view illustrating a configuration of a gas sensor 100 including a sectional view taken along a longitudinal direction of the sensor element 10. The sensor element 10 is a main component of the gas sensor 100 detecting a predetermined gas component in a measurement gas, and measuring concentration thereof. The sensor element 10 is a so-called limiting current gas sensor element.

In addition to the sensor element 10, the gas sensor 100 mainly includes a pump cell power supply 30, a heater power supply 40, and a controller 50.

As illustrated in FIG. 1, the sensor element 10 has a configuration in which one end portion of an elongated planar element base 1 is covered with a porous leading-end protective layer 2.

As illustrated in FIG. 2, the element base 1 includes an elongated planar ceramic body 101 as a main structure, main surface protective layers 170 are provided on two main surfaces of the ceramic body 101, and, in the sensor element 10, the leading-end protective layer 2 is further provided outside both an end surface (a leading end surface 101e of the ceramic body 101) and four side surfaces on one leading end portion. The four side surfaces other than opposite end surfaces in the longitudinal direction of the sensor element 10 (or the element base 1, or the ceramic body 101) are hereinafter simply referred to as side surfaces of the sensor element 10 (or the element base 1, or the ceramic body 101).

The ceramic body 101 is made of ceramic containing, as a main component, zirconia (yttria stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the leading-end protective layer 2), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An outer pump electrode 141 is provided on an outer surface of the ceramic body 101, and an inner pump electrode 142 is provided in the first internal chamber 102. Furthermore, an auxiliary pump electrode 143 is provided in the second internal chamber 103, and a measurement electrode 145 is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have a substantially constant oxygen concentration by a pumping action (pumping in or out of oxygen) of a main pump cell P1, and then introduced into the second internal chamber 103. The main pump cell P1 is an electrochemical pump cell including the outer pump electrode 141, the inner pump electrode 142, and a ceramic layer 101a that is a portion of the ceramic body 101 existing between these electrodes. In the second internal chamber 103, oxygen in the measurement gas is pumped out of the element by a pumping action of an auxiliary pump cell P2 that is also an electrochemical pump cell, so that the measurement gas is in a sufficiently low oxygen partial pressure state. The auxiliary pump cell P2 includes the outer pump electrode 141, the auxiliary pump electrode 143, and a ceramic layer 101b that is a portion of the ceramic body 101 existing between these electrodes.

The outer pump electrode 141, the inner pump electrode 142, and the auxiliary pump electrode 143 are each formed as a porous cermet electrode (e.g., a cermet electrode made of $ZrO_2$ and Pt that contains Au of 1%). The inner pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell P2 to be in the low oxygen partial pressure state is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in an atmosphere in the third internal chamber 104. During the reduction or decomposition, a potential difference between the measurement electrode 145 and the reference electrode 147 is maintained constant. Oxygen ions generated by the above-mentioned reduction or decomposition are pumped out of the element by a measurement pump cell P3. The measurement pump cell P3 includes the outer pump electrode 141, the measurement electrode 145, and a ceramic layer 101c that is a portion of the ceramic body 101 existing between these electrodes. The measurement pump cell P3 is an electrochemical pump cell pumping out oxygen generated by decomposition of NOx in an atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying a voltage necessary for pumping across electrodes included in each of the pump cells. In a case of the measurement pump cell P3, a voltage is applied across the outer pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the outer pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, detecting the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 to at least a location of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 becomes 500° C. or more. In some cases, the sensor element 10 is heated so that the temperature of the gas distribution part as a whole from the gas inlet 105 to the third internal chamber 104 becomes 500° C. or more. These are to enhance the oxygen-ion conductivity of the solid electrolyte forming each pump cell and to desirably demonstrate the ability of each pump cell. In this case, the temperature in the vicinity of the first internal chamber 102, which becomes the highest temperature, becomes approximately 700° C. to 800° C.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are provided on the respective main surfaces of the ceramic body 101 on the side of the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170a, 170b) on the pump surface and the heater surface of the ceramic body 101. The main surface protective layers 170 are layers made of alumina, having a thickness of approximately 5 μm to 30 μm, and including pores with a porosity of approximately 20% to 40%, and are provided to prevent adherence of any foreign matter and poisoning substances to the main surfaces (the pump surface and the heater surface) of the ceramic body 101 and the outer pump electrode 141 provided on the pump surface. The main surface protective layer 170a on the pump surface thus functions as a pump electrode protective layer for protecting the outer pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the outer pump electrode 141 on the side of the one end portion E1 compared with the case illustrated in FIG. 2.

<Details of Leading-End Protective Layer>

In the sensor element 10, the leading-end protective layer 2 that is a porous layer made of alumina having a purity of 99.0% or more is provided around an outermost periphery in a predetermined range from the one end portion E1 of the element base 1 having a configuration as described above.

In the following description, a portion of the leading-end protective layer 2 being in contact with the leading end surface 101e of the ceramic body 101 is referred to as an end surface portion 201, and a portion of the leading-end protective layer 2 being in contact with the four side surfaces including the two main surfaces (the pump surface and the heater surface) on which the main surface protective layers 170 are provided is referred to as a side surface portion 202.

The leading-end protective layer 2 is provided to obtain water resistance in a portion of the element base 1 in which the temperature becomes high when the gas sensor 100 is in use, with surrounding the portion. The leading-end protective layer 2 suppresses the occurrence of cracking (water-induced cracking) of the element base 1 due to thermal shock caused by local temperature reduction upon direct exposure of the portion to water. The leading-end protective layer 2 also has a role of trapping the foreign matter and the poisoning substances to prevent them from entering the element base 1.

Since the leading-end protective layer 2 is a porous layer, gas flows in and out between the gas inlet 105 and the outside at all times regardless of the presence of the leading-end protective layer 2. That is to say, introduction of the measurement gas into the element base 1 (ceramic body 101) through the gas inlet 105 is performed without any problems unless noticeable clogging by the poisoning substances is caused.

The leading-end protective layer 2 is preferably formed to have a thickness of 150 μm or more and 600 μm or less. A thickness of the leading-end protective layer 2 of less than 150 μm is not preferable because, due to reduction in strength of the leading-end protective layer 2 itself, resistance to thermal shock is reduced and water resistance is reduced, and, further, resistance to shock acting due to vibration or other factors is reduced. On the other hand, a thickness of the leading-end protective layer 2 of more than 600 μm is not preferable because, due to an increase in heat capacity of the leading-end protective layer 2, power consumption increases when the heater 150 performs heating, and, due to an increase in gas diffusion time, responsiveness of the sensor element 10 is degraded.

In the end surface portion 201, a distance L2 from the leading end surface 101e of the ceramic body 101 to an outermost surface of the leading-end protective layer 2 in the longitudinal direction of the sensor element 10 corresponds to the thickness of the leading-end protective layer 2.

The leading-end protective layer 2 preferably has a porosity of 15% to 40%. In this case, adhesion to the element base 1, in particular, to the main surface protective layers 170, which are in contact with most of the leading-end protective layer 2, is suitably secured. A porosity of the leading-end protective layer 2 of less than 15% is not preferable because diffusion resistance increases, and responsiveness of the sensor element 10 is degraded. On the other hand, a porosity of more than 40% is not preferable because adhesion to the element base 1 (specifically, adhesion to the leading end surface 101e and the main surface protective layers 170) is reduced, and the strength of the leading-end protective layer 2 is not secured.

A pore size of each of pores of the leading-end protective layer 2 is on the order of sub-micrometers, and is at most on the order of several micrometers.

Figure 3:
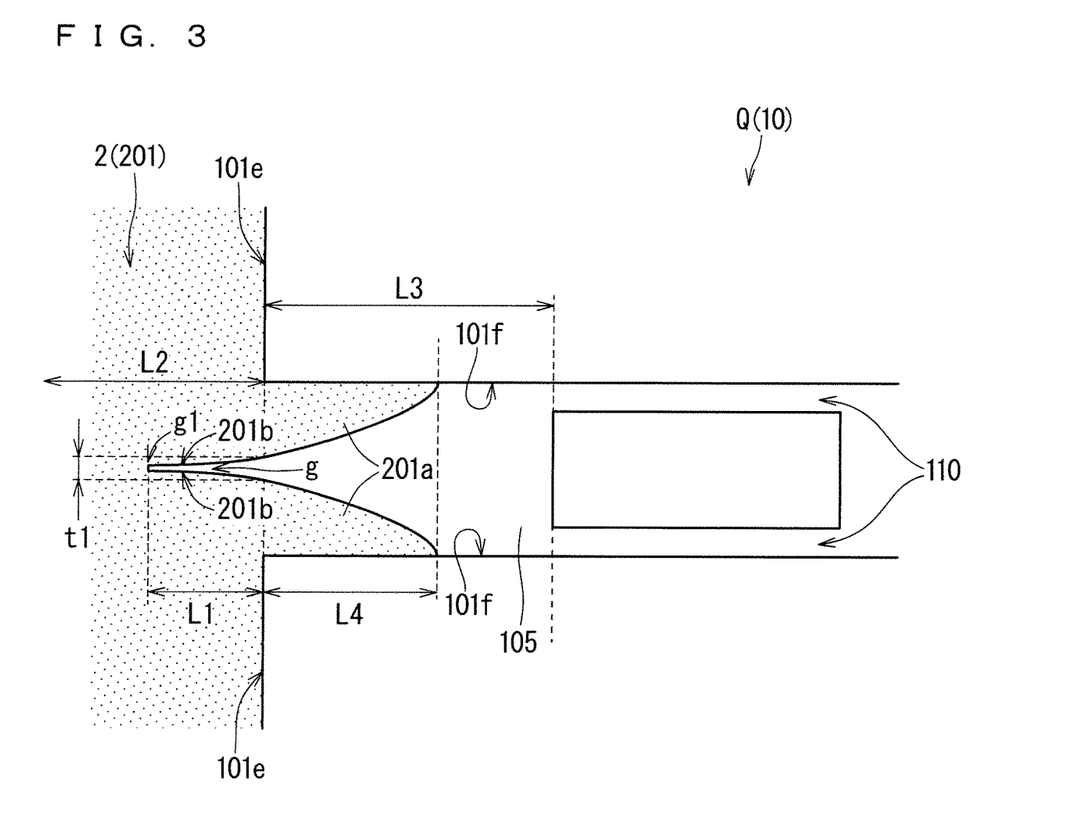
FIG. 3 is an enlarged view in the vicinity of a portion Q on a side of one end portion E1 of the sensor element 10.
Figure 4:
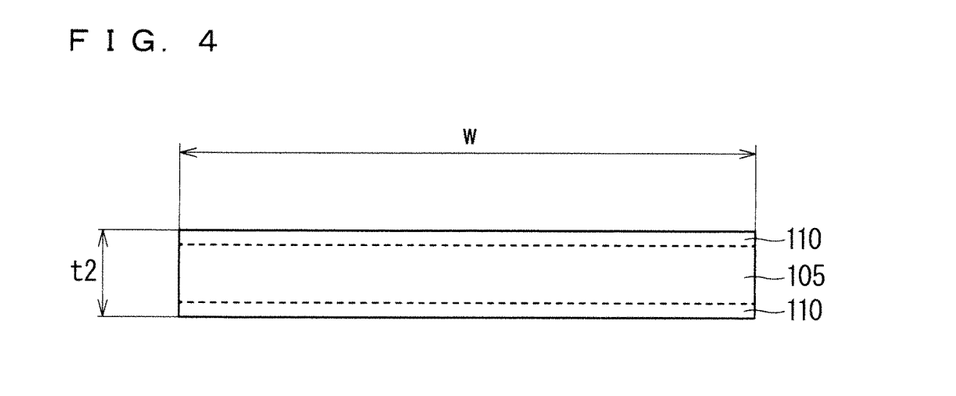
FIG. 4 is a diagram for describing the size of each portion of a gas inlet 105 on a side of a leading end surface 101e.

FIGS. 3 and 4 are diagrams for describing further details of a configuration of the leading-end protective layer 2 in the vicinity of the gas inlet 105. FIG. 3 is an enlarged view in the vicinity of a portion Q on the one end portion E1 of the sensor element 10, which is shown by a broken line in FIG. 2, and FIG. 4 is a diagram for describing the size of each portion of the gas inlet 105 in a cross section perpendicular to the longitudinal direction of the element.

Although simplified for illustration in FIG. 2, in the sensor element 10, the leading-end protective layer 2 has an extension 201a extending into the gas inlet 105 from the end surface portion 201 adhering to the leading end surface 101e of the ceramic body 101, as illustrated in FIG. 3. The extension 201a is fixed to an inner wall surface 101f of the ceramic body 101 demarcating the gas inlet 105 from four sides. However, fixing only to opposite two portions of the inner wall surface 101f is shown in FIG. 3 for illustrative purposes.

The (end surface portion 201 of the) leading-end protective layer 2 is provided so that a gap (hereinafter, a communicating gap) g communicating with a substantially opening portion (portion not occupied by the extension 201a) of the gas inlet 105 is formed outside the leading end surface 101e of the ceramic body 101. In other words, the leading-end protective layer 2 is provided so that a space in the gas inlet 105 extends from the leading end surface 101e to the outside of the ceramic body 101.

More particularly, the communicating gap g is formed by being demarcated by a surface 201b of a portion of the leading-end protective layer 2 continuous with the extension 201a. A pair of portions of the surface 201b opposing each other along a thickness of the element is shown in FIG. 3. A leading end portion (at a location farthest from the leading end surface 101e) g1 of the communicating gap g may be planar or may be pointed.

In the sensor element 10, the leading-end protective layer 2 surrounding the portion of the element base 1 in which the temperature becomes high when the gas sensor 100 is in use has the extension 201a in the above-mentioned manner, so that adhesion of the leading-end protective layer 2 to the leading end surface 101e of the ceramic body 101 serving as the end surface of the element base 1 is more sufficiently secured compared with that in a conventional sensor element. Delamination and, further, detachment of the leading-end protective layer 2 on the side of the leading end surface of the element base 1 are thereby suitably suppressed even if the sensor element 10 is frequently subjected to thermal shock due to repeated heating up and cooling down during long-term use. That is to say, the sensor element 10 can be said to be less likely to undergo a sensitivity change caused by delamination and, further, detachment of the leading-end protective layer even during long-term use, and thus have high reliability.

On the other hand, in the gas inlet 105, a space surrounded by the extension 201a has a smaller cross-sectional size than a space not surrounded by the extension 201a. The measurement gas passes through the leading-end protective layer 2 as the porous layer to reach the gas inlet 105 that is sufficiently wider than each of the pores of the leading-end protective layer 2, and then, is introduced into the sensor element 10 through the gas inlet 105. As a result of providing a portion of the leading-end protective layer 2 inside the gas inlet 105 as the extension 201a, a through-path for the measurement gas to reach the gas inlet 105 is considered to be limited to make it difficult for the measurement gas to reach a space inside the gas inlet 105 (a part where the extension 201a does not exist).

Specifically, as the measurement gas has to reach the extension 201a or the space surrounded by the extension 201a to be introduced into the sensor element 10, reduction in inflow of the measurement gas and, further, reduction in detection sensitivity of the gas sensor 100 are likely to be caused noticeably once clogging of the extension 201a by poisoning substances is caused. In other words, the extension 201a provided inside the gas inlet 105 may be understood to seemingly increase a risk of causing reduction in detection sensitivity of the gas sensor 100.

In the sensor element 10, the leading-end protective layer 2 is provided not to completely close the gas inlet 105 but so that the communicating gap g communicating with the gas inlet 105 is formed at a location of the leading end surface 101e to deal with a risk as described above. In other words, the communicating gap g is provided to substantially extend an opening portion of the gas inlet 105 into the leading-end protective layer 2.

With this configuration, the measurement gas is not necessarily required to directly reach the gas inlet 105, but rather is introduced into the sensor element 10 without passing through the extension 201a once reaching the communicating gap g before the gas inlet 105. That is to say, in the sensor element 10, the through-path for the measurement gas to reach the gas inlet 105 is suitably secured by providing the communicating gap g while the extension 201a of the leading-end protective layer 2 is provided inside the gas inlet 105.

Furthermore, when the communicating gap g is considered as a part of the gas inlet 105, the area of contact between the leading-end protective layer 2 and the gas inlet 105 is greater in a case where the communicating gap g is provided than in a case where the communicating gap g is not provided, and thus the influence of clogging of the leading-end protective layer 2 by the poisoning substances on the inflow of the measurement gas and, further, on the detection sensitivity of the gas sensor 100 is smaller in the case where the communicating gap g is provided than in the case where the communicating gap g is not provided. This means that reduction in detection sensitivity of the gas sensor 100 is suitably suppressed by providing the communicating gap g while the extension 201a is provided.

More particularly, when L1 represents the distance of the leading end portion g1 of the communicating gap g from the leading end surface 101e (an extension distance of the communicating gap g), L2 represents the thickness of the leading-end protective layer 2 in the end surface portion 201 (see FIG. 2), t1 represents a size of the communicating gap g in a direction along the thickness of the element (communicating gap height) at the location of the leading end surface 101e, and t2 represents an opening height that is a size of the gas inlet 105 in the direction along the thickness of the element (see FIG. 4), the communicating gap g is provided to satisfy the following equations:

$$0.15 \leq L1/L2 \leq 0.8; \text{ and}$$

$$0.1 \leq t1/t2 \leq 0.7.$$

L1, t1, and t2 are herein set to each have a value of approximately several tens of micrometers that is sufficiently greater than a value of the pore size of each of the pores of the leading-end protective layer 2 (being on the order of sub-micrometers and at most on the order of several micrometers). This means that the communicating gap g and each of the pores of the leading-end protective layer 2 are clearly distinguished from each other not only by the form of existence but also by the size.

A ratio L1/L2 of less than 0.15 or a ratio t1/t2 of less than 0.1 is not preferable because the communicating gap g becomes narrow or short so that the effect of providing the communicating gap g cannot suitably be obtained.

A ratio L1/L2 of more than 0.8 is not preferable because durability of the end surface portion 201 of the leading-end protective layer 2 is reduced.

A ratio t1/t2 of more than 0.7 is not preferable because adhesion of the extension 201a of the leading-end protective layer 2 to the inner wall surface 101f of the gas inlet 105 is reduced.

The gas inlet 105 is provided so that a distance L3 of an innermost part of the gas inlet 105 (the beginning of the first diffusion control part 110) from the leading end surface 101e of the ceramic body 101 satisfies an equation 100 µm ≤ L3 ≤ 500 µm.

A distance L3 of less than 100 µm is not preferable because it is likely that formation particles of the leading-end protective layer 2 scattered during formation of the leading-end protective layer 2 (in particular, the extension 201a) enter the first diffusion control part 110 to cause clogging to thereby increase diffusion resistance to more than expected at designing.

On the other hand, a distance L3 of more than 500 µm is not preferable because, to maintain a predetermined element size, it is required to shorten the diffusion control part, and it becomes difficult to achieve desired diffusion resistance, or, to secure the size of the diffusion control part, the element size is elongated.

The extension 201a is formed so that a formation range L4 of the extension 201a from the leading end surface 101e in the longitudinal direction of the element is 8% or more and 75% or less of the distance L3 (0.08 ≤ L4/L3 ≤ 0.75), in other words, an adherence ratio of the extension 201a from a leading end surface side inside the gas inlet 105 is 8% or more and 75% or less.

A ratio L4/L3 of less than 0.08 is not preferable because the effect of securing adhesion by the extension 201a is not sufficiently obtained.

On the other hand, a ratio L4/L3 of more than 0.75 is not preferable because the extension 201a is similar to the diffusion control part having a slit-like shape, and operation of each pump cell of the sensor element 10 becomes different from operation expected at designing. A problem in that formation of the extension 201a is difficult and requires higher cost also arises.

The gas inlet 105 preferably has an aspect ratio t2/w that is a ratio of the opening height (thickness) t2 to an opening width w of the gas inlet 105 of 0.015 to 0.15 and an opening area $S = w \cdot t2$ of 0.1 mm² to 0.9 mm².

An aspect ratio t2/w of less than 0.015 or an opening area S of less than 0.1 mm² is not preferable because it is difficult to form the extension 201a.

On the other hand, an aspect ratio t2/w of more than 0.15 or an opening area S of more than 0.9 mm² is possible by increasing at least one of the opening width w and the opening height t2, but is not preferable because a discrepancy from the size and the shape of the internal space becomes noticeable, and productivity decreases due to difficulty of simultaneous formation with the internal space in this case.

As described above, according to the present embodiment, the leading-end protective layer as the porous layer is provided at least around a portion of the element base of the sensor element included in the gas sensor in which the temperature becomes high when the gas sensor is in use, and a portion of the leading-end protective layer is extended into the gas inlet on the one end portion of the element base and is fixed to the inner surface of the gas inlet while the gap is formed to communicate from the gas inlet into the leading-end protective layer. The sensor element in which delamination and, further, detachment of the leading-end protective layer on the leading end surface side of the element base caused by application of thermal shock are suitably suppressed and reduction in sensitivity caused by clogging of the leading-end protective layer by the poisoning substances is suitably suppressed can thus be achieved.

<Process of Manufacturing Sensor Element>

Figure 5:
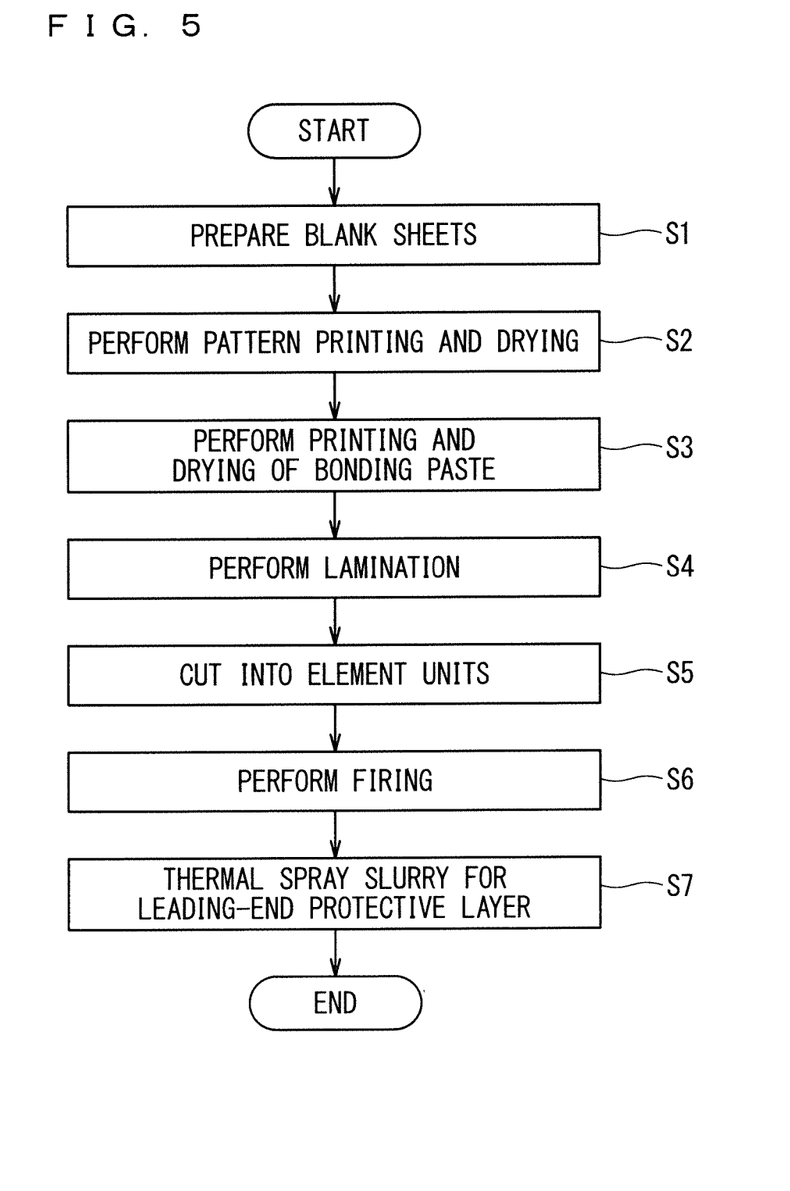
FIG. 5 is a flowchart of processing at the manufacture of the sensor element 10.

One example of a process of manufacturing the sensor element 10 having a configuration and features as described above will be described next. FIG. 5 is a flowchart of processing at the manufacture of the sensor element 10.

At the manufacture of the element base 1, a plurality of blank sheets (not illustrated) being green sheets containing the oxygen-ion conductive solid electrolyte, such as zirconia, as a ceramic component and having no pattern formed thereon are prepared first (step S1).

The blank sheets have a plurality of sheet holes used for positioning in printing and lamination. The sheet holes are formed to the blank sheets in advance prior to pattern formation through, for example, punching by a punching machine. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material (vanishing material) for forming the first diffusion control part 110, the second diffusion control part 120, the third diffusion control part 130, and the fourth diffusion control part 140 is also performed at the time of pattern printing.

The patterns are printed by applying pastes for pattern formation prepared in accordance with the properties required for respective formation targets onto the blank sheets using known screen printing technology. A known drying means can be used for drying after printing.

After pattern printing on each of the blank sheets, printing and drying of a bonding paste are performed to laminate and bond the green sheets (step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination.

After the laminated body is obtained as described above, the laminated body is cut out at a plurality of locations to obtain unit bodies eventually becoming the individual element bases 1 (step S5).

The unit bodies as obtained are then each fired at a firing temperature of approximately 1300° C. to 1500° C. (step S6). The element base 1 is thereby manufactured. That is to say, the element base 1 is generated by integrally firing the ceramic body 101 made of the solid electrolyte, the electrodes, and the main surface protective layers 170. Integral firing is performed in this manner, so that the electrodes each have sufficient adhesion strength in the element base 1.

Figure 6:
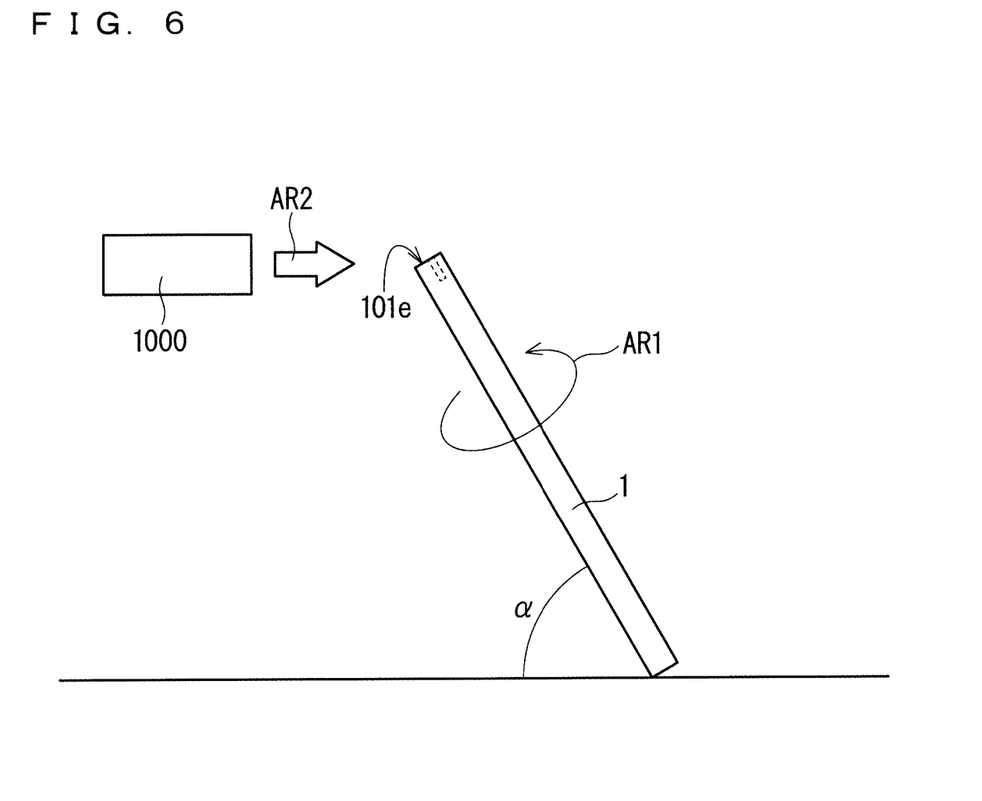
FIG. 6 schematically illustrates formation of a leading-end protective layer 2 by plasma-spraying.

After the element base 1 is manufactured in the above-mentioned manner, the leading-end protective layer 2 is formed with respect to the element base 1. The leading-end protective layer 2 is formed by a method of plasma-spraying. FIG. 6 schematically illustrates formation of the leading-end protective layer 2 by plasma-spraying.

The leading-end protective layer 2 is formed by plasma-spraying slurry containing alumina powder as a material for forming the leading-end protective layer 2 at a predetermined formation target location (step S7).

Specifically, as illustrated in FIG. 6, after the element base 1 is inclined to have a predetermined inclination angle $\alpha$ with a side of the leading end surface 101e being up, the element base 1 is continuously rotated about an axis in the longitudinal direction of the element as shown by an arrow AR1 while changing the inclination angle $\alpha$. During the rotation, the slurry is thermal sprayed from a thermal spray gun 1000 towards the side of the leading end surface 101e as shown by an arrow AR2. The slurry thus adheres to the side surfaces of the element base 1, the end surface of the element base 1 (the leading end surface 101e of the ceramic body 101), and a predetermined range inside the gas inlet 105.

As the alumina powder, powder having a maximum particle diameter of 50 μm or less and $D_{50}$ of 23 μm or less is suitable.

The inclination angle $\alpha$ and a rotation speed of the element base 1 are adjusted as appropriate to enable the slurry to adhere to the inner wall surface 101f demarcating the gas inlet 105 so that an adherence ratio has a predetermined value within a range of 8% to 75% in the leading-end protective layer 2 eventually formed, and the communicating gap g is formed to have a desired size.

The sensor element 10 is completed by formation of the thermal sprayed film.

The sensor element 10 thus obtained is housed in a predetermined housing, and built into the body, which is not illustrated, of the gas sensor 100.

<Modifications>

The above-mentioned embodiment is targeted at a sensor element having three internal chambers, but the sensor element is not necessarily required to have a three-chamber configuration. That is to say, the configuration in which the extension extending into the gas inlet is provided to the leading-end protective layer that is the porous layer surrounding the end surface and the predetermined range of the side surfaces on the one end portion of the element base is applicable to a sensor element having one internal chamber or two internal chambers.

Figure 7:
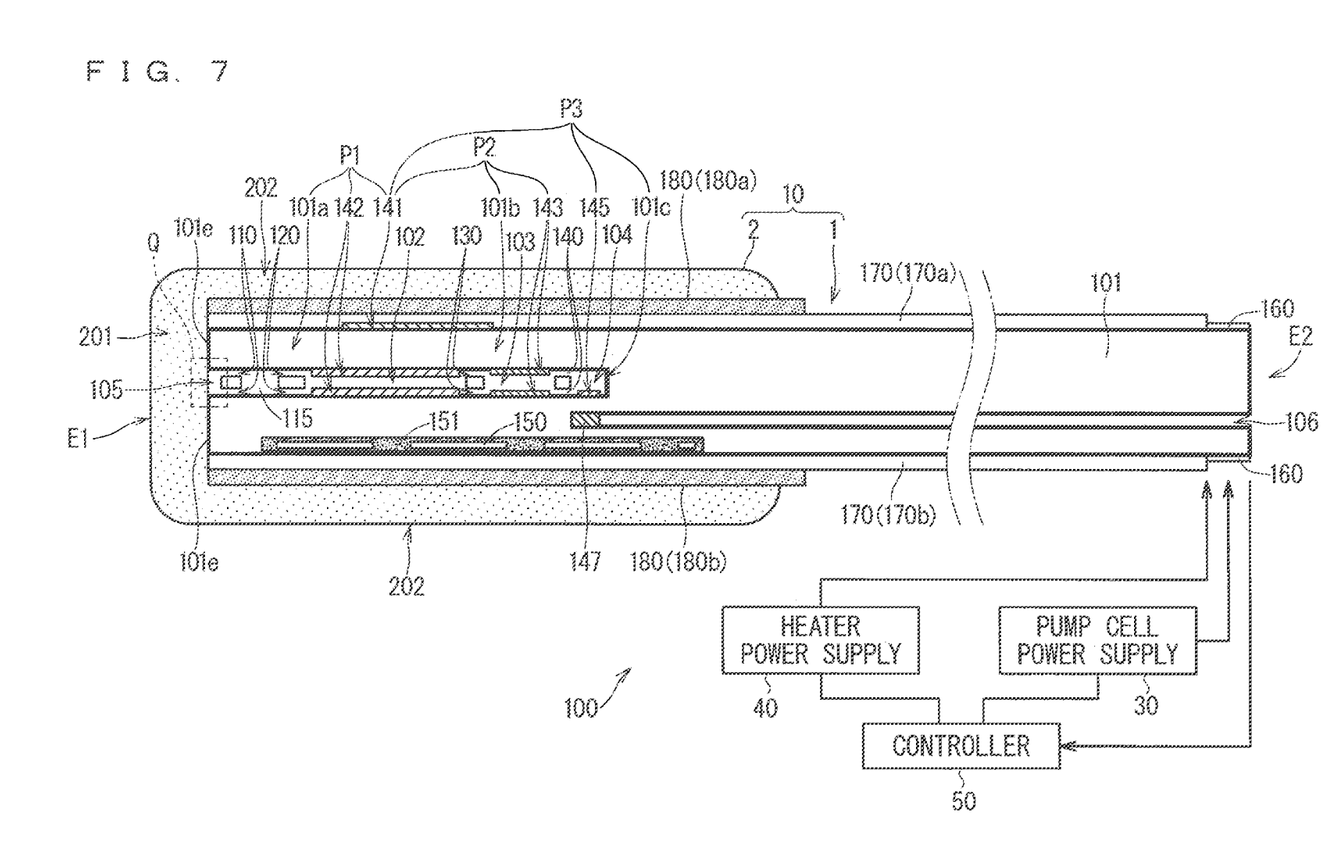
FIG. 7 is a schematic view illustrating a configuration of the gas sensor 100 in a case where the sensor element 10 includes a buffer layer 180.

Although the leading-end protective layer 2 is provided directly to the element base 1 in the above-mentioned embodiment, the leading-end protective layer 2 is not necessarily required to be provided directly to the element base 1. FIG. 7 is a schematic view illustrating a configuration of the gas sensor 100 in a case where the sensor element 10 includes a buffer layer 180 between the element base 1 and the leading-end protective layer 2.

The sensor element 10 illustrated in FIG. 7 includes the buffer layer 180 outside the four side surfaces (on an outer periphery other than the leading end surface 101e) of the element base 1 on the one end portion E1. The leading-end protective layer 2 is provided further outside the buffer layer 180. In FIG. 7, a pump surface-side portion 180a and a heater surface-side portion 180b of the buffer layer 180 are illustrated.

The buffer layer 180 is a porous layer made of alumina, having a relatively large porosity of 30% to 50%, and having a thickness of 20 μm to 50 μm.

In a case where the buffer layer 180 is provided, the leading-end protective layer 2 preferably has a smaller porosity than the buffer layer 180. When the buffer layer 180 has a larger porosity, a so-called anchoring effect acts between the leading-end protective layer 2 and the buffer layer 180 as an underlying layer. Due to the action of the anchoring effect, in the sensor element 10, delamination of the leading-end protective layer 2 from the element base 1 caused by a difference in coefficient of thermal expansion between the leading-end protective layer 2 and the element base 1 is more suitably suppressed when the sensor element 10 is in use.

The buffer layer 180 has a role of preventing poisoning and exposure to water of the sensor element 10, together with the leading-end protective layer 2 and the main surface protective layers 170. In particular, the buffer layer 180 has higher heat insulating properties than the leading-end protective layer 2 and the main surface protective layers 170 when the buffer layer 180 has a larger porosity than the leading-end protective layer 2. This contributes to improvement in water resistance of the sensor element 10.

The buffer layer 180 also has a role as the underlying layer when the leading-end protective layer 2 is formed with respect to the element base 1. From this viewpoint, the buffer layer 180 is only required to be formed, on the side surfaces of the element base 1, at least in a range surrounded by the leading-end protective layer 2.

Manufacture of the sensor element 10 including the buffer layer 180 as illustrated in FIG. 7 is achieved by further performing, with respect to an individual element body obtained by the procedures shown in FIG. 5, a process of forming (applying and drying) a pattern eventually becoming the buffer layer 180, and then firing. The pattern is formed using a paste prepared in advance so that the buffer layer 180 as desired is eventually formed. That is to say, the element base 1 of the sensor element 10 illustrated in FIG. 7 is generated by integrally firing the ceramic body 101 made of the solid electrolyte, the electrodes, the main surface protective layers 170, and the buffer layer 180.

EXAMPLES

As the sensor element 10, five types of sensor elements 10 (Examples 1 to 5) having different combinations of the extension distance L1 of the communicating gap g, the thickness L2 of the leading-end protective layer 2 in the end surface portion 201, the distance L3 of the innermost part from the leading end surface 101e of the ceramic body 101, the formation range L4 of the extension 201a from the leading end surface 101e, the communicating gap height t1, and the opening height t2 of the gas inlet 105 were manufactured. Each of the sensor elements 10, however, was set to have a thickness L2 of 200 μm, a distance L3 of 300 μm, and an opening height t2 of 200 μm. The aspect ratio t2/w and the area S of the opening portion of the gas inlet 105 at a location at which the extension 201a was not provided were respectively set to 0.08 and 0.5 mm².

Values of L1 to L4 and t1 and t2 of each of the sensor elements in Examples 1 to 5 are shown in Table 1.

TABLE 1

| LEVEL | L1 | L2 | L3 | L4 | t1 | t2 |
|---|---|---|---|---|---|---|
| EXAMPLE 1 | 100 | 200 | 300 | 150 | 67 | 200 |
| EXAMPLE 2 | 50 | 200 | 300 | 90 | 50 | 200 |
| EXAMPLE 3 | 30 | 200 | 300 | 30 | 50 | 200 |
| EXAMPLE 4 | 160 | 200 | 300 | 180 | 140 | 200 |
| EXAMPLE 5 | 67 | 200 | 300 | 225 | 20 | 200 | in micrometers

The sensor elements 10 in Examples 1 to 5 have different combinations of L1 to L4 and t1 and t2, to thereby have different combinations of the adherence ratio (L4/L3) of the extension 201a of the leading-end protective layer 2 to the inner wall surface 101f, the ratio L1/L2 of the extension distance L1 of the communicating gap g to the thickness L2 of the leading-end protective layer 2, and the ratio t1/t2 of the communicating gap height t1 to the opening height t2 of the gas inlet 105.

As a comparative example, a sensor element not having the extension 201a and the communicating gap g was manufactured. The comparative example was manufactured under the same condition as Examples 1 to 5 except for formation of the extension 201a.

A heating/cooling cycle test in which heating up and down and an atmosphere change were cyclically repeated was conducted on each of the sensor elements in the examples and the comparative example as obtained to evaluate resistance to thermal shock, and whether the leading-end protective layer 2 was delaminated from the leading end surface 101e (resistance to delamination) was determined after the test. An accelerated poisoning test was also conducted to determine resistance to poisoning after the test. In the heating/cooling cycle test, a temperature profile of "keeping at 950° C. for five minutes" and then "keeping at 300° C. for five minutes" was set as one cycle of heating up and down, and it was repeated 600 times. A test gas atmosphere was an exhaust gas atmosphere with λ=1.1 at 950° C., and was an ambient atmosphere at 300° C. X-ray CT was used to determine whether the leading-end protective layer 2 was delaminated.

The adherence ratio (a value of L4/L3) and the results of determination on the resistance to delamination for each sensor element are shown in Table 2 as a list. In Table 2, a cross is marked for the sensor element in which delamination has been identified, and a circle is marked for the sensor element in which delamination has not been identified by the X-ray CT.

TABLE 2

| LEVEL | PRESENCE OR ABSENCE OF POROUS PROTECTIVE LAYER INSIDE GAS INTRODUCTION PART | L4/L3 | RESISTANCE TO DELAMINATION |
|---|---|---|---|
| EXAMPLE 1 | PRESENT | 0.50 | ◯ |
| EXAMPLE 2 | PRESENT | 0.30 | ◯ |
| EXAMPLE 3 | PRESENT | 0.10 | ◯ |
| EXAMPLE 4 | PRESENT | 0.60 | ◯ |
| EXAMPLE 5 | PRESENT | 0.75 | ◯ |
| COMPARATIVE EXAMPLE | ABSENT | 0 | X |

As shown in Table 2, delamination of the leading-end protective layer 2 has not been identified in the sensor elements in Examples 1 to 5, and has been identified only in the sensor element in the comparative example.

In the accelerated poisoning test, each sensor element was placed in an atmosphere at 500° C. of an exhaust gas (containing HC, NOx, $CO_2$, $H_2O$, and the like) from the engine to which ZnDTP (zinc dialkyldithiophosphate) of 0.25 cc/L had been added as a pseudo poisoning substance.

A pump current Ip0 in the main pump cell P1 of each sensor element was measured before and after the accelerated poisoning test to evaluate the validity of operation of the sensor element. The pump current Ip0 was measured under a model gas atmosphere containing oxygen at an $O_2$ concentration of 20.5 mol % and nitrogen as the remainder.

A ratio of a difference value of the pump current Ip0 before and after the test to a value of the pump current Ip0 before the test (pump current change rate) was calculated, and resistance to poisoning of each sensor element was determined using the magnitude of the ratio.

The presence or absence of the communicating gap g and the results of determination on the resistance to poisoning for each sensor element are shown as a list.

TABLE 3

| LEVEL | PRESENCE OR ABSENCE OF COMMUNICATING GAP | L1/L2 | t1/t2 | RESISTANCE TO POISONING |
|---|---|---|---|---|
| EXAMPLE 1 | PRESENT | 0.50 | 0.33 | ◎ |
| EXAMPLE 2 | PRESENT | 0.25 | 0.25 | ◎ |
| EXAMPLE 3 | PRESENT | 0.15 | 0.25 | ◯ |
| EXAMPLE 4 | PRESENT | 0.80 | 0.70 | ◎ |
| EXAMPLE 5 | PRESENT | 0.33 | 0.10 | ◯ |
| COMPARATIVE EXAMPLE | ABSENT | 0 | 0 | X |

As for the determination on the resistance to poisoning, when the pump current change rate is 5% or less, the sensor element is determined to have excellent resistance to poisoning, and a double circle is marked for the sensor element in Table 3. When the pump current change rate is more than 5% and 10% or less, the sensor element is determined to have practically allowable resistance to poisoning, and a single circle is marked for the sensor element in Table 3. A cross is marked for the sensor element having a pump current change rate of more than 10% and thus not corresponding to any of these sensor elements in Table 3.

In Table 3, the double circle or the single circle is marked for each of the sensor elements in Examples 1 to 5, whereas the cross is marked for the sensor element in the comparative example on the resistance to poisoning.

The results shown in Tables 2 and 3 indicate that, as in the above-mentioned embodiment, in providing the leading-end protective layer to the sensor element, the influence of the poisoning substances on measurement sensitivity can suitably be suppressed by forming the communicating gap communicating from the gas inlet into the leading-end protective layer in a case where a configuration in which the leading-end protective layer extends from the leading end surface into the gas inlet and is fixed to the inner wall surface of the gas inlet to secure adhesion to the leading end surface of the element is used.

While the invention has been shown and described in detail, the foregoing description is in all aspects illustrative and not restrictive. It is therefore understood that numerous modifications and variations can be devised without departing from the scope of the invention.

What is claimed is:

1. A sensor element included in a gas sensor detecting a predetermined gas component in a measurement gas, said sensor element comprising:
    an element base including:
        an elongated planar ceramic body made of an oxygen-ion conductive solid electrolyte, and having a gas inlet at one end portion thereof;
        at least one internal chamber located inside said elongated planar ceramic body, and communicating with said gas inlet under predetermined diffusion resistance;
        at least one electrochemical pump cell including an outer pump electrode located on an outer surface of said elongated planar ceramic body, an inner pump electrode located to face said at least one internal chamber, and a solid electrolyte portion of the oxygen-ion conductive solid electrolyte located between said outer pump electrode and said inner pump electrode, said at least one electrochemical pump cell pumping in and out oxygen between said at least one internal chamber and an outside; and
        a heater buried on a side of said one end portion of said elongated planar ceramic body and extending for a first predetermined distance in a direction perpendicular to a leading end surface of said element base on said one end portion of said elongated planar ceramic body; and
    a porous leading-end protective layer covering said leading end surface of said element base and four side surfaces of said element base for a second predetermined distance in the direction perpendicular to said leading end surface of said element base on said one end portion of said elongated planar ceramic body, wherein
    said porous leading-end protective layer has an extension extending into said gas inlet and fixed to an inner wall surface of said elongated planar ceramic body demarcating said gas inlet, and
    a gap communicating with said gas inlet is located in said porous leading-end protective layer, wherein the gap is demarcated by a surface of a portion of said porous leading-end protective layer continuous with said extension and extends into said porous leading-end protective layer in a direction outside said leading end surface of said element base.

2. The sensor element according to claim 1, wherein $0.15 \leq L1/L2 \leq 0.8$, where L1 is an extension distance of said gap in a longitudinal direction of said sensor element, and L2 is a thickness of said porous leading-end protective layer on said side of said one end portion of said elongated planar ceramic body.

3. The sensor element according to claim 2, wherein $0.1 \leq t1/t2 \leq 0.7$, where t1 is a size of said gap in a direction along a thickness of said sensor element at a location of said one end portion of said elongated planar ceramic body, and t2 is an opening height of said gas inlet in said direction along said thickness of said sensor element.

4. The sensor element according to claim 3, wherein $100 \ \mu m \leq L3 \leq 500 \ \mu m$, and $0.08 \leq L4/L3 \leq 0.75$, where L3 is a distance of an innermost part of said gas inlet from said leading end surface of said element base, and L4 is a formation range of said extension from said leading end surface in said longitudinal direction of said element base.

5. The sensor element according to claim 2, wherein $100 \ \mu m \leq L3 \leq 500 \ \mu m$, and $0.08 \leq L4/L3 \leq 0.75$, where L3 is a distance of an innermost part of said gas inlet from said leading end surface of said element base, and L4 is a formation range of said extension from said leading end surface in said longitudinal direction of said element base.

6. The sensor element according to claim 1, wherein $0.1 \leq t1/t2 \leq 0.7$, where t1 is a size of said gap in a direction along a thickness of said sensor element at a location of said one end portion of said elongated planar ceramic body, and t2 is an opening height of said gas inlet in said direction along said thickness of said sensor element.

7. The sensor element according to claim 6, wherein $100 \ m \leq L3 \leq 500 \ \mu m$, and $0.08 \leq L4/L3 \leq 0.75$, where L3 is a distance of an innermost part of said gas inlet from said leading end surface of said element base, and L4 is a formation range of said extension from said leading end surface in a longitudinal direction of said element base.

8. The sensor element according to claim 1, wherein $100 \ \mu m \leq L3 \leq 500 \ \mu m$, and $0.08 \leq L4/L3 \leq 0.75$, where L3 is a distance of an innermost part of said gas inlet from said leading end surface of said element base, and L4 is a formation range of said extension from said leading end surface in a longitudinal direction of said element base.

\* \* \* \* \*